(12) United States Patent
Morales Ueno et al.

(10) Patent No.: US 11,116,204 B2
(45) Date of Patent: Sep. 14, 2021

(54) METHOD FOR THE CRYOPRESERVATION OF HIGH-VISCOSITY BIOLOGICAL SAMPLES

(71) Applicant: CENTRO DE INVESTIGACIÓN CIENTÍFICA Y DE EDUCACIÓN SUPERIOR DE ENSENADA, BAJA CALIFORNIA (CICESE), Ensenada Baja California (MX)

(72) Inventors: Karina Morales Ueno, Ensenada (MX); Carmen Guadalupe Paniagua Chávez, Ensenada (MX)

(73) Assignee: CENTRO DE INVESTIGACION CIENTIFICA Y DE EDUCACION SUPERIOR DE ENSENADA, BAJA CALIFORNIA (CICESE)

( * ) Notice: Subject to any disclaimer, the term of this patent is extended or adjusted under 35 U.S.C. 154(b) by 260 days.

(21) Appl. No.: 16/332,110

(22) PCT Filed: Sep. 18, 2017

(86) PCT No.: PCT/MX2017/050012
§ 371 (c)(1),
(2) Date: Mar. 11, 2019

(87) PCT Pub. No.: WO2018/052279
PCT Pub. Date: Mar. 22, 2018

(65) Prior Publication Data
US 2019/0216078 A1    Jul. 18, 2019

(30) Foreign Application Priority Data
Sep. 19, 2016    (MX) .................. MX/a/2016/013026

(51) Int. Cl.
*A01N 1/02*    (2006.01)

(52) U.S. Cl.
CPC .............. *A01N 1/021* (2013.01); *A01N 1/02* (2013.01)

(58) Field of Classification Search
None
See application file for complete search history.

(56) References Cited

U.S. PATENT DOCUMENTS

| 2004/0067480 A1* | 4/2004 | Brockbank | .......... | A01N 1/0221 435/1.1 |
|---|---|---|---|---|
| 2019/0059363 A1* | 2/2019 | Lai | ....................... | A01N 1/0221 |

FOREIGN PATENT DOCUMENTS

| CN | 101703039 | | 5/2010 |
| DE | 102012021900 | * | 5/2014 |
| EP | 2641966 | | 9/2013 |
| WO | 2015057641 | | 4/2015 |
| WO | 2016054145 | | 4/2016 |

OTHER PUBLICATIONS

Lichtenstein G. et al. Development of Sperm Cryopreservation Techniques in Pejerrey Odontesthes bonariensis. Aquaculture 306(104)357-361, Aug. 2010. (Year: 2010).*

* cited by examiner

*Primary Examiner* — Ralph J Gitomer
(74) *Attorney, Agent, or Firm* — Emerson, Thomson & Bennet, LLC; Roger D. Emerson; Peter R. Detorre

(57) ABSTRACT

A protocol for the cryopreservation of high viscosity biological samples, preferably of spermatic samples of crustaceans or insects, that enables maintaining intact the physical properties of the original sample preserving the viability of the sperm packet.

2 Claims, 3 Drawing Sheets

METHOD FOR THE CRYOPRESERVATION OF HIGH-VISCOSITY BIOLOGICAL SAMPLES

FIELD OF THE INVENTION

The present invention relates to a protocol of cryopreservation of high viscosity biological samples, such as sperm samples of invertebrates and more particularly to a new protocol that enables cryopreservation of very high viscosity sperm samples, for example sperm samples of crustaceans, fully maintaining the viability of the sperm packet contained in such samples.

BACKGROUND OF THE INVENTION

Cryopreservation of biological tissue and fluid samples is one of the most widely used preservation techniques in biology to maintain cells alive and in good condition for extended periods of time, without even altering their physiognomy or metabolic activity, to this end cryopreservation maintains the tissue and/or fluid in stasis, where the metabolic cell activities stop completely, thus preventing that enzymatic degradation processes occur.

In order to achieve the above, samples of biological tissue and/or fluids must undergo a previous treatment to reduce the probability of crystal formation due to the abrupt temperature drop; this is achieved through the addition of cryoprotectant substances that prevent crystal formation during the freezing process either from reducing the quantity of intracellular water and/or from altering their behavior by modifying the attractive forces between the water molecules, for example by breaking the hydrogen bonds.

However, even though presently it is possible to cryopreserve different types of samples for extended periods of time, it is in the in vitro fertilization field where there have been more setbacks, since it is not only necessary to maintain viable cells, but it is important as well to maintain their cellular morphology and physiologic properties intact, considering that in many animal species the loss of for example the adhesive power of the spermatozoa, prevents the fertilization and production of viable embryos.

In order to try to overcome said difficulties various cryopreservation protocols have been developed, such as the ones named in patent CN 101703039 A, which describes a diluting solution for sperm material of the crustacean *Charybdis japonica*, whose function is to enable a homogenization of the tissue before putting it in contact with cryoprotectant agents to be used for its conservation in liquid nitrogen tanks, aiming for the sperm packet to be in direct contact with the utilized solutions. However, the cryopreservation protocol described dilutes the sample entirely and as a result its physical properties are lost, to the detriment of the fertilizing power of the spermatozoa. Furthermore, in said protocol only DMSO is used as cryoprotectant agent and its mixture with another compound that maintains osmotic balance is not described.

Patent EP 2641966 A1, describes a composition for vitrification processes of biological samples, comprising a permeable cryoprotectant compound to the cell membrane and a non-permeable cryoprotectant compound to the cell membrane, being the permeable cryoprotectant content to the cell membrane in the range of 30% to 50% regarding the total volume of the composition. Nonetheless, to be able to use the proposed solution it is required to completely disintegrate the cell samples and, consequently, the original physical properties of the treated samples are lost.

Patent Application WO 2015057641 A1, protects a system for the cryopreservation of tissues and the method to carry out the vitrification of biological samples. The significance of said application lies in the fact that it describes the vitrification solution employed as containing a permeable cryoprotectant agent (DMSO) and a non-permeable cryoprotectant agent (Trehalose). However, there is no mention of the use of other solutions nor a direct indication of the concentration in which the cryoprotectant agents are used. In addition, the treated samples must be completely disintegrated and suspended in order to be in contact with the cryoprotectant solution, as a result, the original physical properties of the treated sample would be lost in their entirety.

None of the available protocols for cryopreservation enables treating high viscosity biological samples without requiring their total disintegration. Moreover, in all cases is necessary to completely suspend and homogenize the samples so that they can be in close contact with the cryoprotectant agent employed, therefore, they would not be susceptible to be used when the intention is to preserve the original physical properties of the sperm packet.

In view of this issue, it is essential to provide a protocol for the cryopreservation of high viscosity biological samples that enables maintaining the original physical properties of the samples, without diluting them in order to be cryopreserved and, in addition, preserves the viability of the sperm packet intact. Furthermore, it is necessary to provide a protocol for the cryopreservation of high viscosity biological samples that in the event of containing gametes, preserves their fertilizing capacity.

SUMMARY OF THE INVENTION

A primary object of the present invention is to provide a new protocol for the cryopreservation of high viscosity biological samples.

A further object of the present invention is to provide a protocol for the cryopreservation of high viscosity biological samples that is able to preserve the cell viability of such samples.

It is as well an object of the invention, to provide a protocol for the cryopreservation of high viscosity biological samples that enables the cryopreservation of sperm samples of invertebrates, particularly sperm samples of crustaceans, bees, butterflies or any other invertebrate whose sperm contains high viscosity characteristics.

One more object of the present invention is to provide a protocol for the cryopreservation of high viscosity biological samples that enables preserving high cell viability in samples of invertebrates.

Another object of the present invention is to offer a protocol for the cryopreservation of high viscosity biological samples that enables preserving the initial physical properties of the samples originally treated.

An additional object of the present invention is to provide a protocol for the cryopreservation of high viscosity biological samples that enables conserving the spermatozoa fertility of invertebrates, for example, from crustaceans and insects spermatozoa.

The aforementioned objects, along with others, and the advantages of the present invention, will become apparent based on the following detailed description of said invention.

DETAILED DESCRIPTION OF THE INVENTION

Figure 1:
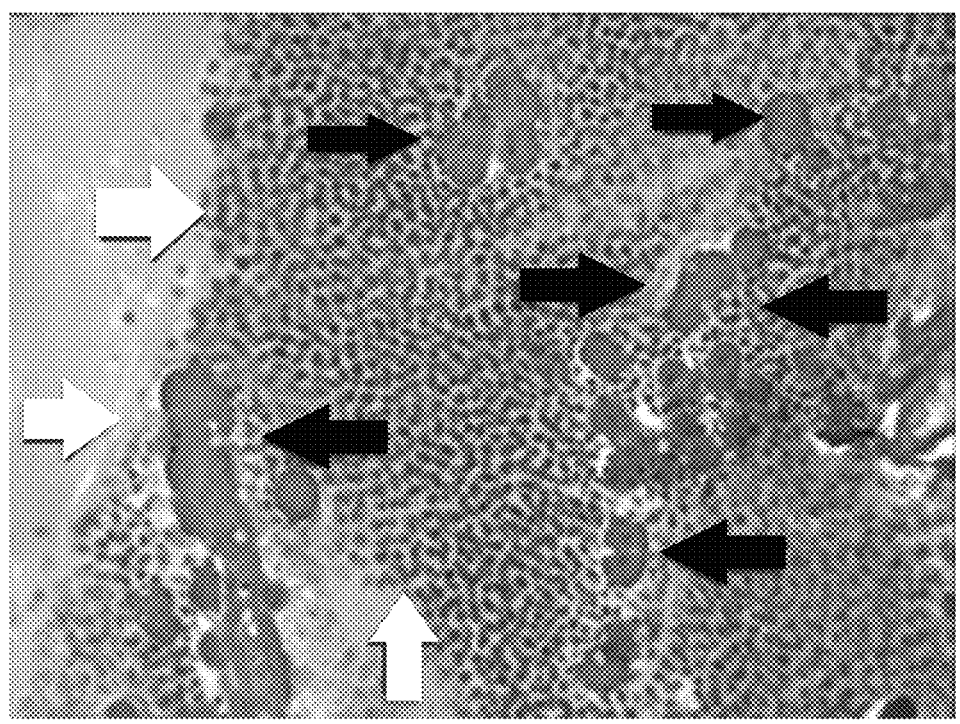
FIG. 1 shows a histological cross-section of the sperm mass before vitrification (fresh sample) showing eosinophilic structures possibly from protein origin (black arrows), included among the spermatozoa (round basophilic structures; see white arrows). 200 times magnification.

The present invention provides a new protocol for the cryopreservation of high viscosity biological samples, which enables conserving the original physical properties of the treated samples without losing the viability of the sperm packet. The present protocol is particularly useful to accomplish the cryopreservation of sperm samples of invertebrates, such as crustaceans and insects, and has proven to be particularly useful for shrimp sperm samples.

In order to achieve the above, the protocol of the present invention comprises the following steps:

a) Placing a sample of high viscosity biological material, loaded in a suitable device, in a tube or cryovial containing an extender aqueous solution preferably composed by 2.125 g/kg of NaCl, 0.110 g/kg of KCl, 0.052 g/kg of $H_3BO_3$, 0.019 g/kg of NaOH, 0.484 g/kg of $MgSO_4.7H_2O$ and 20 µl for each 100 ml of extender solution from a solution containing 10000 IU of penicillin, 10 mg of streptomycin and 25 µg of amphotericin B, for a period of time ranging from 18 to 22 minutes at a temperature of 21° C. to 25° C., with the sample not being in contact with the solution nor the inner walls of the tube, using to that effect an appropriate sample retrieval device;

b) Submerging the sample in Trehalose at 0.25-0.5M for a period of time ranging from 18 to 22 minutes;

c) Transferring the sample to a cryoprotectant/vitrification solution composed by 0.25-0.5M of Trehalose and 10-20% of DMSO in an extender solution, submerging only ⅔ of it for a period of time ranging from 2 to 4 minutes;

d) Removing the sample from the cryoprotectant solution and place it immediately in liquid nitrogen;

e) Placing the sample in a cryovial and store it ultimately in liquid nitrogen between −196° C. and −200° C.

Thawing of the sample is carried out by extracting the sample from the liquid nitrogen and submerging it in water bath at a temperature of 35° C. to 39° C. for a period of time ranging from 4 to 9 minutes, to subsequently extract it from the cryovial and place it for a period of time ranging from 15 to 25 minutes, in an equilibrated solution containing 0.25-0.5 M of Trehalose.

With the aforementioned protocol it is possible to maintain the original consistency of the sample without losing viability of the cell mass, as well, it has proven to be particularly useful for the cryopreservation of sperm samples of invertebrates, such as crustaceans and insects, demonstrating to be particularly useful in the cryopreservation of shrimp spermatophores.

Example. Cryopreservation of Shrimp Sperm Samples

In order to attest the vitrification protocol of the present invention in comparison with other evaluated protocols, shrimp spermatophores samples were treated, which were manually obtained by slightly pressing the base of the genital pore located between the fifth pair of pereiopods and the petasma. The sperm of said samples was separated by pressing the anterior region of the spermatophores between the index finger and thumb.

The evaluated solutions to cryopreserve the spermatozoa in the white shrimp *P. vannamei* were Trehalose, dimethyl sulfoxide (DMSO), and polyethylene glycol (PEG). The combination and concentration of the vitrification agents previously mentioned (Trehalose, DMSO, and PEG) were assigned to the following treatments: A) PEG at 6% and DMSO at 15%; B) Trehalose 0.25-0.5 M and DMSO at 10-15%; and C) Trehalose 0.25-0.5 M and DMSO at 16-20%. Once the treatments were prepared, they were stored at 5° C. until their usage. All cryoprotectant agent concentrations were prepared in the extender solution mentioned in step a) of the protocol for the present invention.

Sperm samples of each spermatophore were placed in a loading device, specifically designed for this type of samples, and were deposited in a vertical position inside a 2 milliliter cryovial containing 100 µL of extender solution. In this process, the sample was cautiously handled in order to prevent contact with the inner walls of the cryovial or with the solution; the sample was stored for 20 minutes at ambient temperature (23° C.).

Afterwards, the loading device was deposited into the different treatments allowing only two thirds of the sperm sample to be in contact with the cryoprotectant solutions. Said step was crucial for the assessment, because when more than ⅔ of the sample were deposited into the solution a detachment of the sample from the loading device was caused, and when depositing it in less quantity proper penetration of the cryoprotectant agents into the sample was not allowed.

The cryopreserving solutions were added in two steps: for treatment A in step 1, the sperm sample was submerged in a solution containing half of the total concentration of the cryoprotectant agent (PEG 3% and 7.5% DMSO) for a minute. Step 2 comprised plunging the sample into the total concentration of the cryoprotectant agent (PEG 6% and DMSO 15%) for 20 seconds; step 1 for treatments B and C comprised submerging the samples in Trehalose for 20 minutes and later, in step 2, to submerge only ⅔ in the vitrification solution B (Trehalose 0.25-0.5 M and DMSO at 10-15%) or C (Trehalose 0.25-0.5 M and DMSO at 16-20%). After the incorporation of the cryoprotectant agents, the loading device containing the sperm sample, was rapidly introduced in liquid nitrogen and placed in a 2 mL cryovial. Subsequently, the cryovial was stored for 24 hours in a tank of liquid nitrogen ranging from −196° C. and −200° C.

To demonstrate the efficiency of these protocols, experiments using 96 spermatophores from 48 males were conducted. The collected spermatophores were randomly assigned to different treatments each day. Half of the samples were assigned to fertilize the females, and the other half was transferred to the facilities of CICESE, in Ensenada, Baja Calif., where the verification of the quality of the cryopreserved sperm would be conducted.

For the thawing, the cryovials were extracted from the liquid nitrogen tank and each sample was rapidly submerged in water bath at approximately 37° C. during 6 seconds. Later, they were placed for 15-25 minutes in the equilibrated solution (0.25-0.5 M of Trehalose) and were stored at ambient temperature until their usage for the artificial fertilization or viability assessment. Both the fertilization and the viability assessment in light microscope were carried out at the installations of Maricultura del Pacifico, S.A. de C.V. The viability assessment using fluorescent probes and histology was conducted at the facilities of the Subsistema de Recursos Genéticos Acuáticos (SUBNARGENA, by its Spanish initials), located in CICESE.

In order to carry out the fertilization, the thawed samples were suspended in the extender solution described in step a) of the present invention protocol, and their viability was evaluated. Ten sperm samples were assigned by treatment for the artificial insemination of 10 females ready to ovulate. The only treatment producing nauplii after artificial insemination was treatment B (Trehalose 0.25-0.5 M and DMSO at 10-15%).

Furthermore, seven of the samples transferred to CICESE were used to assess their viability. Thawed samples were placed into a tube containing 1 mL of extender solution in order to be disintegrated with a tissue homogenizer during 30 seconds. Once the suspension was made, cells were stained with the LIVE/DEAD® Sperm Viability Kit (Life Technologies, Eugene, Oreg., USA) in the following manner: 5 μL of SYBR 14 stain were added to a milliliter of the cell suspension (final concentration 100 nM) and were incubated for 10 minutes in the dark at ambient temperature (23° C.); afterwards, 5 μL of propidium iodide dye were added (PI, final concentration 12 μM) incubating in the dark for another 10 minutes at ambient temperature. Once the dyeing process was over, an aliquot of 20 μL was placed on a slide and the cells were visualized under a fluorescence microscope (Nikon Eclipse 80i), with a blue excitation fluorescence filter for green fluorescence. Cells stained with SYBR 14 dye (green) were considered cells with intact cell membrane, while the cells stained with PI (red) were considered cells with damaged cell membrane. A total of 100 cells by slide were evaluated, and finally the percentage of cells with intact cell membrane was determined, presenting the treated samples a percentage of 100% of cells with intact cell membrane, according to their histology.

Figure 2:
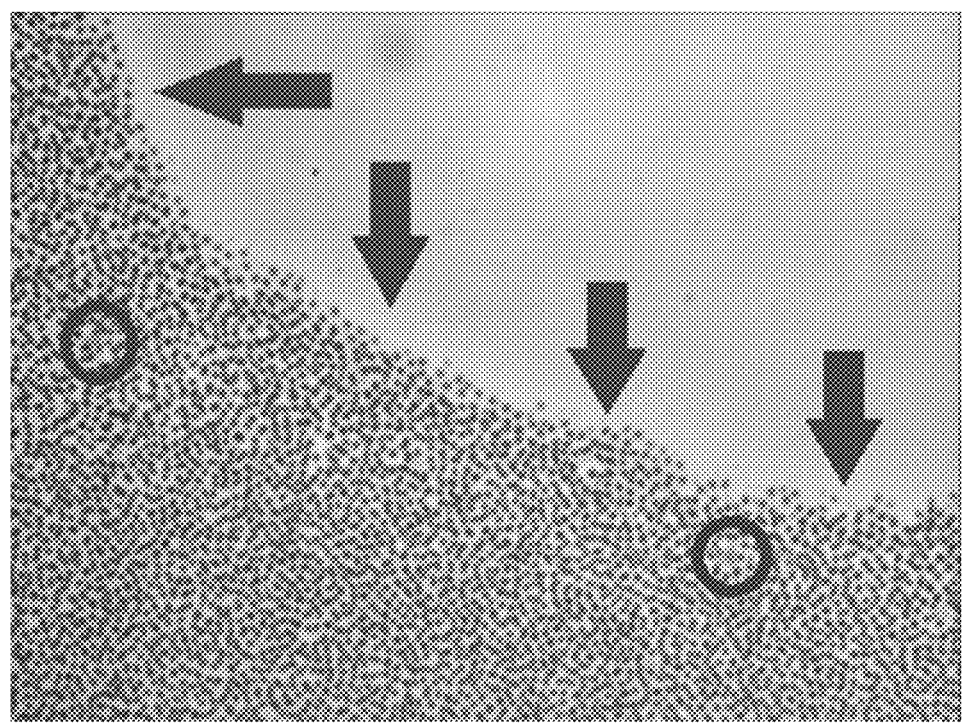
FIG. 2 shows a histological cross-section of the thawed sperm mass (after vitrification) from treatment B, displaying few eosinophilic structures (circles). Such structures are lost in the vitrification process possibly due to their protein origin and cold denaturation, while the spermatozoa remain intact (black arrows). 200 times magnification.
Figure 3:
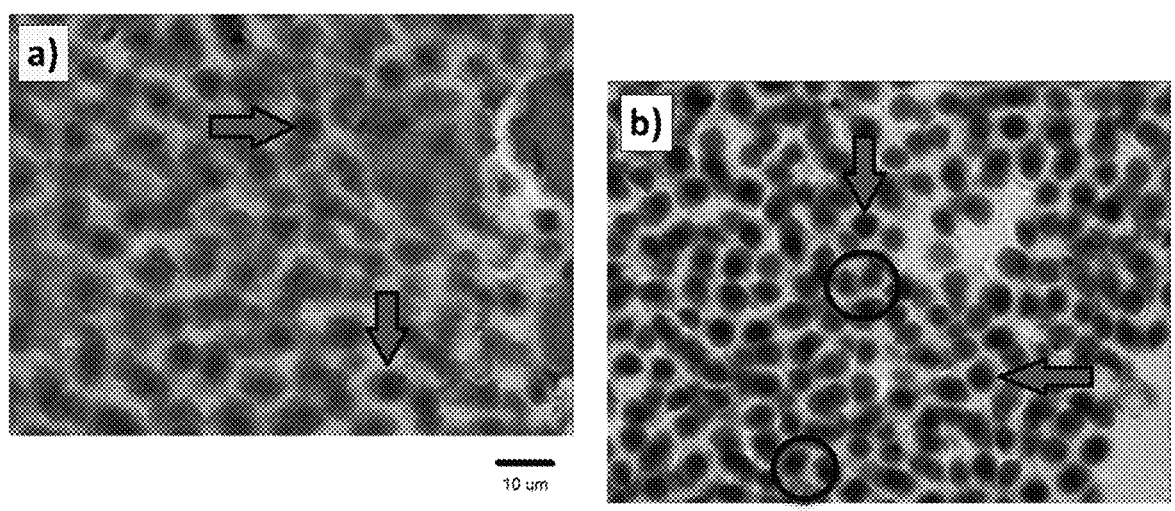
FIG. 3 shows the comparison between a histological cross-section of a sperm mass before freezing or fresh sample (a), and a thawed sperm sample from treatment B (b) where intact spermatozoa (arrows) and some eosinophilic structures (circles) previously displayed in FIGS. 1 and 2 are observed.

Three samples of thawed and equilibrated sperm were each meticulously wrapped in rice paper and placed into a histology cassette to be fixed for approximately 48 hours in modified Davidson's solution. Later, the samples were dehydrated in a series of alcohols, included paraffin, cut (8-micron thick) and stained with hematoxylin-eosin. The slides were examined under a light microscope and the morphological characteristics of the sperm were evaluated. After their histological analysis, differences in the sperm structure among the thawed samples from treatments B, C, and the fresh samples without treatment were not found (FIGS. 1 to 3). The rest of the treatments did not display presence of spermatozoa.

In order to evaluate the viability through observation with optical microscope, the sperm samples in the equilibrated solution (Trehalose 0.25-0.5 M for 15 to 20 minutes), were homogenized with 1.5 mL of extender solution. An aliquot of 20 μL was examined with a magnification of 400× after staining the aliquots with nigrosin at 10% and the existing morphological changes were evaluated and recorded. The spermatozoa that maintained the morphological characteristics intact (spherical bodies and complete spikes) were considered viable, while those with irregular cell bodies or malformed or missing spikes, were considered not viable. To determine the viability percentage 100 spermatozoa were counted, in triplicate, in at least five vision fields per examined slide, finding in all cases a 100% percentage of viability.

The aforementioned results show that with the protocol for the present invention it is possible to maintain the viability of the cell mass of high viscosity biological samples without affecting their original morphological properties; likewise, the protocol of the present invention enables conserving the functionality of the cryopreserved cells.

The present invention has been described according to a preferred method; however, for a technician with average expertise in the subject will be apparent that modifications to the invention may be made without departing from its spirit and scope.

The invention claimed is:
1. A method for cryopreservation of shrimp spermatophores or sperm mass wherein the method comprises the steps of:
   a) placing a sample of shrimp spermatophores or sperm mass in a cryovial tube having an inner wall containing an extender aqueous solution for a period of time ranging from 18 to 22 minutes at a temperature of 21° C. to 25° C., said extender aqueous solution comprising 2.125 g/Kg of NaCl, 0.110 g/Kg of KCl, 0.052 g/Kg of $H_3BO_3$, 0.019 g/Kg of NaOH, 0.484 g/Kg of $MgSO_4.7H_2O$ and, 20 μl of a solution containing 10000 IU of penicillin, 10 mg of streptomycin and 25 μg of amphotericin B;
   b) submerging the sample in Trehalose at 0.25-0.5M for a period of time ranging from 18 to 22 minutes;
   c) transferring the sample into a cryoprotectant/vitrification solution comprising 0.25-0.5 M of Trehalose, 10-15% of DMSO, and the extender aqueous solution of step a), submerging only ⅔ of said sample for a period of time ranging from 2 to 4 minutes;
   d) removing the sample from the cryoprotectant/vitrification solution and immediately submerge said sample in liquid nitrogen; and
   e) placing the sample in a cryovial and storing said cryovial in liquid nitrogen at a temperature ranging from −196° C. to −200° C.
2. The method according to claim 1, wherein said method additionally comprises the steps of thawing the sample by removing the sample from the liquid nitrogen, and submerging the sample in a water bath at a temperature from 35° C. to 39° C. for a period of time ranging from 4 to 9 minutes, to subsequently remove the sample from the cryovial and place the sample for a period of time of 15-25 minutes in an equilibrated solution containing 0.25 M of Trehalose.

\* \* \* \* \*